March 4, 1969     P. L. ANDERSSON ET AL     3,431,406

CHECK DIGIT VERIFIERS

Original Filed July 3, 1958     Sheet _1_ of 3

INVENTORS
Per L. Andersson
Oliver G. Aberth

ATTORNEY

FIG. 4.

INVENTORS
Per L. Andersson
Oliver G. Aberth

ATTORNEY

United States Patent Office 3,431,406
Patented Mar. 4, 1969

3,431,406
CHECK DIGIT VERIFIERS
Per L. Andersson, Berwyn, Pa., and Oliver G. Aberth, Urbana, Ill., assignors to Sperry Rand Corporation, New York, N.Y., a corporation of Delaware
Original application July 3, 1958, Ser. No. 746,521, now Patent No. 3,183,482, dated May 11, 1965. Divided and this application Mar. 22, 1965, Ser. No. 441,656
U.S. Cl. 235—153                    12 Claims
Int. Cl. G06f *11/00;* G08b *29/00;* G06k *5/00*

ABSTRACT OF THE DISCLOSURE

A check digit verifier is described wherein a prime number of signal input devices each representative of a different digital value are selectively interconnected through a relay matrix to a prime number of storage devices each of which when energized represents a different digital value. The relay interconnection between the signal input devices and the storage devices is automatically made so that upon actuation of a signal input device a new accumulated total is inserted in the storage devices which is equal to a fixed multiple of the previous accumulated total and the digit value being entered.

---

The present invention is a division of our prior application Ser. No. 746,521, filed July 3, 1958, now U.S. Patent 3,183,482, and relates to improved systems for forming check symbols and verifying the accuracy of messages by use of such check symbols; and is more particularly concerned with mechanizations of improved form adapted to accept a series of characters, including a check symbol, to determine whether or not errors have occurred during the formation of or previous operations concerning said series of characters.

The concept of employing check digits in association with number sets is well known at the present time, and various systems have been suggested heretofore for computing a check digit corresponding to a given series of numbers and for thereafter operating with said series of numbers and its associated check digit to verify, throughout a series of computations, that the number is being properly transmitted or employed without alteration, transposition, or the like, of any numbers comprising said series. In general, the series of numbers is treated in accordance with a predetermined mathematical rule to determine a check digit which corresponds to that series of numbers; and in particular, the individual numbers of a series of numbers may be weighed, added and subtracted from one another, and otherwise treated to produce a single further number termed a "check digit" which accompanies the original series of numbers. The check digit thus computed is such that if any one number of the original series is altered, or if a transposition is made of any two numbers of the original series, the resulting modified series will have a check digit other than that originally computed, whereby computation of the check digit associated with any given series of numbers and comparison of this computed check digit with a previously computed check digit, known to be proper for the original series, immediately determines whether or not any errors have occurred. The use of such check digits, and in particular the improved check digit system contemplated by the present invention, will be more readily appreciated from the following discussion.

When information is entered into a data proccessing machine such as a bookkeeping machine, card punch machine, paper tape perforator, Teletype machine, etc., some means of detecting an error in the entry of such information is desirable. When such information is entered manually, via a keyboard, such error detection is not only usually desirable but frequently imperative. Since the multiplicty and variety of errors introduced by manual operation is far greater than those introduced by machine operation, the following discussion and description will be restricted to keyboard type entries in order to simplify the illustration of the concept of this invention. It is to be understod, however, that this limitation in the discussion should not be construed as limiting the invention to keyboard operation. Often the information handled is of such a nature that errors are apparent upon inspection; and this is particularly the case when ordinary plain text English is processed on a typewriter or type setting machine. Also in many commercial applications numerical keyboard entries can be checked by the use of the appropriate controlling totals. An improved means of verifying a keyboard entry is made available through the check symbol system herein disclosed.

The use of check symbols or check digits necessitates appending to each group of N symbols $S_N S_{N-1}$ * * * $S_2 S_1$ comprising an individual entry, an extra $S_0$, termed the "check symbol" or "check digit" which increases the length of the entry to $N+1$ symbols. The choice of the particular check symbol employed for any entry is fixed according to some predetermined rule by the original symbols in the series $S_N, S_{N-1},$ * * * $S_1$. Normally, when the entry is made via a keyboard, the assignment of check symbols is made as each symbol group originates, so that the person operating the keyboard is usually presented with a complete sequence $S_N, S_{N-1}$ * * * $S_2 S_1 S_0$, which includes not only the original number series but which includes as well the check symbol as the last symbol or digit of the sequence.

Some verifying mechanism adapted to cooperate with this resulting series may then be attached to the data processing machine; and this mechanism preferably communicates with the keyboard and is so constructed that it is capable of independently calculating the appropriate check symbol for the number fed into the machine via the keyboard. Thus, when an entry is made correctly on the keyboard, the entered check symbol and the check symbol calculated by the said verifying mechanism will agree with one another thereby indicating that no error of entry has been made. If, however, the operator in entering the sequence has made an error in striking the keys, then, since the verifying mechanism receives an entry differing from the original number series, it is to be expected that its calculated check symbol and the one entered by the operator will disagree. Such a discrepancy can be indicated by an appropriate signalling device such as a glow lamp and/or keyboard lock; and this indicating device can serve to warn the operator of his error, thereby allowing him to correct it.

In practical applications, the rule for assigning check symbols or check digits to series of characters must satisfy two conditions: (1) It should be possible to construct a reasonably inexpensive mechanism for automatically calculating and/or verifying check symbols according to the rule selected; and (2) Detection of common operator errors should be assured.

Clearly, it is impossible, by the use of a single check symbol, to detect every conceivable operator error, for there will always be many keyboard entries which have the same check symbol; and accordingly, if one entry is converted to another having the same check symbol through some operator error, no indication of this error will result. Usually, however, it is sufficient if only certain common types of errors are detected since such common errors make up the vast majority of errors encountered in practice. These most likely errors can be classified roughly as follows:

(1) *Single symbol error.*—This occurs when the operator strikes the wrong key for one of the symbols comprising the enry, as for instance in entering 327$\underline{5}$159 for 326$\underline{5}$159.

(2) *Transposition.*—Here two symbols are interchanged in position. Most frequently the two symbols affected occupy adjacent positions (e.g., $\underline{38}$279 in place of $\underline{32}$879); but occasionally they are two or more positions apart (e.g., $\underline{8}$23$\underline{7}$9 or $\underline{7}$28$\underline{3}$9 in place of $\underline{3}$28$\underline{7}$9).

(3) *Three symbol interchange.*—This occurs when three adjacent symbols of the form ABA are converted to BAB, as for instance in entering $\underline{474}$1 in place of $\underline{747}$1.

(4) *Double transposition.*—This type of error usually arises when four adjacent symbols of the form ABBA are converted to the symbols BAAB; or when the symbols ABAB are converted to BABA. By way of example, the error occurs when 2$\underline{9339}$4 is entered in the keyboard in place of 2$\underline{3993}$4; or when 71$\underline{5656}$ is entered in place of 71$\underline{6565}$.

It will be appreciated, from the following discussion that errors of the four types mentioned above can be immediately detected by appending a check symbol or check digit to the series in accordance with this invention.

To illustrate a particular mode of assigning check symbols, according to the present invention, which satisfies both requirements mentioned previously for a practical system, it is convenient to restrict the discussion temporarily to the case of numeric entries. Accordingly, let us assume that a keyboard has only ten keys for the digits zero through nine, inclusive. Check symbols may be assigned in the following manner: For each original entry consisting of N digits, $A_n$, $A_{n-1}$ * * * $A_1$, the weighted sum of the digits $$K_n A_n + K_{n-1} A_{n-1} + \text{* * *} + K_1 A_1 = \Sigma KA$$

is formed. In this weighted sum, the K's are integers and their values may, in one embodiment, be $K_1=2$, $K_2=4$, $K_3=8$, $K_4=5$, $K_5=10$, $K_6=9$, $K_7=7$, $K_8=3$, $K_9=6$, $K_{10}=1$; $K_{11}$ through $K_{20}$ have the same values as $K_1$ through $K_{10}$ respectively; $K_{21}$ through $K_{30}$ are also equal to $K_1$ through $K_{10}$, etc., for as many K's as are necessary to form the weighted sum. It should be noted that the weights thus selected have the property that each weight is the double of the preceding weight, counting in modulo 11. More specifically, and noting that in this embodiment only ten keys or ten different characters are assumed, the K's are so chosen that $K_{j+1}$ equals either $2K_j$ or $2K_j-11$. When the weighted sum for a digit group has been found, the check digit is then chosen as the smallest integer (including zero) which, when added to the weighted sum makes the result an exact multiple of eleven, i.e., the check digit or check symbol employed is the 11's complement of the weighted sum discussed above.

By way of example, a check digit for the number 352566 may be derived, using the weights mentioned previously, by forming the weighted sum:

$$3 \times 9 + 5 \times 10 + 2 \times 5 + 5 \times 8 + 6 \times 4 + 6 \times 2 = 163$$

Since the sum 163 is itself not a multiple of 11, and inasmuch further as 165 (i.e., 163+2) is the smallest multiple of 11 greater than 163, the check digit for this entry is 2. This digit 2 is accordingly appended to the original number series so that the operator actually enters 3525662. Since the check digit can have eleven different values, e.g., 0 through 10, an extra key must be added to the numeric keyboard for entering the value of ten; and a special symbol $x$ may be used to indicate this added key.

Choosing the check digit in this manner affords protection against all four types of errors listed previously. By way of example, changing a single digit $A_i$ to $A_i'$ will affect the sum $\Sigma KA$ by an amount $(A_i'-A_i)K_i$; and since neither $K_i$ nor $(A_i'-A_i)$ are divisible by eleven, their product is not divisible by eleven. Accordingly, the sum $\Sigma KA$ is changed by an amount which will alter the corresponding computed check digit, and this error is detected.

Similarly, a transposition between two different digits $A_i$ and $A_j$ would change the sum $\Sigma KA$ by an amount $(A_j-A_i)K_i+(A_i-A_j)K_j=(A_j-A_i)(K_i-K_j)$; and unless $K_i$ equals $K_j$, the sum would again be changed by an amount not divisible by eleven thereby resulting in a computed check digit which differs from the one actually entered. It should be noted that $K_i$ will equal $K_j$ only if the two characters transposed are 10, 20, 30, etc., positions apart for modulo 11; and this possibility is so remote as to be entirely negligible in practice.

A three-digit interchange performed on the digits $A_{i+2}$, $A_{i+1}$, $A_i$, where $A_i$ equals $A_{i+2}$, alters the sum $\Sigma KA$ by an amount $(A_{i+1}-A_i)(K_{i+2}-K_{i+1}+K_i)$. By using the relationship between the K's discussed previously, and by dropping all multiples of eleven as insignificant, this change reduces to $(A_{i+1}-A_i)3K_i$; and again this comprises an amount that must alter the check digit.

By similar analysis, it will be seen that double transpositions may also be detected, whereby all of the four types of errors most commonly occurring will be immediately detected by the particular form of weighting contemplated by the present invention. Moreover, by analysis similar to those given above, it will be readily apparent that if one of the four types of errors mentioned involves the check digit itself, detection of this error is still guaranteed.

As mentioned previously, a check digit verifier is preferably employed, and is attached to the keyboard of the overall structure, to detect any entry errors which may occur. Such a verifying mechanism may be simplified in design by recognizing the following considerations. First, it should be noted that the weighted sum of the original digits of the entry plus the check digit must always be a multiple of eleven (i.e., as mentioned previously, the check digit selected is preferably the 11's complement of the weighted sum of the original number series). Therefore, rather than requiring that the verifying mechanism compute the proper check digit and then compare its selection with the check digit actually entered by the operator, with a discrepancy signalling an error, it is sufficient to require that the verifying mechanism form the weighted sum of the entire entry (including the appended check digit, having a weight of "one" assigned thereto); and the verifying mechanism can then signal an error only if the sum computed thereby is not zero, or a multiple of eleven.

As a second consideration, it should be noted that since all that is needed is a determination of whether or not the computed sum is zero or a multiple of eleven, the mechanism can be permitted to discard eleven whenever it attempts to form a sum higher than eleven. By way of example if the verifying mechanism contains a partial result of 8, and 7 is to be added thereto to form the true sum of 15 (i.e., 11 plus 4), it is permissible to have the mechanism merely form the number 4, i.e., the verifying mechanism may be so constructed as to automatically discard 11's as they occur during formation of the weighter sum.

Finally, because of the relationship betwen the K's nam namely that $K_{i+1}$ equals either $2K_i$ or $2K_i-11$, the mechanism can prove the check digit in the following manner: Starting from a cleared or zero position, the mechanism accepts the first digit entered, $A_n$, then doubles this number and adds it to the next digit entered, $A_n-1$; doubles this new result, etc.; and proceeds in this manner to add each digit as it is entered, with a subsequent doubling of the result, until all digits, including the check digit, have been accepted. Whether or not the proper check digit has been entered can then be determined by detecting whether or not the final result contained in the verifying mechanism is a multiple of 11 (or zero, since multiples of 11 are dropped).

To verify the foregoing doubling and adding technique, let us assume that the entry consists of the sequence $A_n, A_{n-1} * * * A_1, A_0$ were $A_0$ is a proper check digit, and no operator error has been made. After $A_n$ is entered, the verifying mechanism will contain either $2A_n = K_1 A_n$ itself, or some number differing from this by a multiple of 11. After $A_{n-1}$ is entered, the result will differ from $2(K_1 A_n + A_{n-1}) = K_2 A_n + K_1 A_{n-1}$, only by a multiple of 11 (or zero). Similarly, after $A_{n-2}$ is entered, the result will be $$2(K_2 A_n + K_1 A_{n-1} + A_{n-2}) = K_3 A_n + K_2 A_{n-1} + K_1 A_{n-2}$$

except for a possible multiple of 11. Finally, after $A_1$ has been entered, the mechanism will contain $$K_n A_n + K_{n-1} A_{n-1} + * * * K_1 A_1$$

minus a multiple of 11.

Inasmuch as $A_0$, the check digit or check symbol, has been chosen equal to the smallest integer which when added to the above weighted sum will cause the result to be a multiple of 11, its entry must cause the mechanism to hold zero, or a multiple of 11 as the final sum, when the further property of the mechanism of discarding 11's is taken into consideration. Note especially that in spite of the fact that $A_0$ is the check digit, it is handled by the mechanism in exactly the same manner as the other digits. Its addition causes a sum of zero to obtain, and the subsequent doubling of zero preserves this zero result. The choice of $A_0$ as the 11's complement of the weighted sum $\Sigma KA$ allows it to be treated in this manner, with a subsequent economy in mechanism, depending upon the specific design which is adopted.

A specific example has been given previously for the formation of a check digit for the number 352566 by using the weights:

1, 6, 3, 7, 9, 10, 5, 8, 4, 2 where 2 is the weight of the least significant digit; and it will be recalled that the check digit computed by using these weights was determined to be 2. The validity of utilizing the doubling and addition process as an equivalent method of forming the check digit will be perhaps most readily apparent by a specific example showing how this process may be applied to the same number 352566. The steps would be as follows:

(1) Doubling 3 gives 6;
(2) Adding 5 gives 11; and by casting out 11's we have the partial result of zero;
(3) Doubling zero gives zero; and adding 2 gives 2;
(4) Doubling 2 gives 4; and adding 5 gives 9;
(5) Doubling 9 gives 18; and by casting out 11's this equals 7;
(6) Adding 6 gives 13; and by casting out 11's results in a sum of 2;
(7) Doubling 2 gives 4 and adding 6 gives 10;
(8) Doubling 10 gives 20, and by casting out 11's produces a final weighted sum of 9;
(9) The check digit is now, in accordance with the principles discussed above, selected so as to be the 11's complement of the weighted sum thus computed; and accordingly, the check digit is produced by subtracting 9 from 11 thereby producing a check digit or symbol of 2. It will be noted that this is the same check digit which was derived previously.

The addition and doubling process has been illustrated above as an alternate method for calculation of the check digit in accordance with the fact that $\Sigma KA$ minus a possible multiple of 11 is obtained after the addition and doubling process is performed on the digits $A_n$ to $A_1$. Assuming that the check digit of 2 has been previously calculated, then continuing the process to include it, we obtain a sum of 11 upon adding 2 to 9, and dropping the multiple of 11 to get zero, and doubling, a result of zero is obtained, which would indicate an error-free entry in the case of verifying mechanism. Accordingly this example has illustrated the addition and doubling process both as a means of calculation of check digits and as a means of verifying entries which already have check digits appended to them.

The particular system of weights discussed above, and the verifying or proving mechanism constructed in accordance with the present invention and adapted to operate with such a weighting system, has a number of distinct advantages. First, all entries, including the check digit entries, can be made on the same keyboard. Second, the mechanism checks entries of any length, and nevertheless is capable of detecting the common errors discussed previously, notwithstanding the length of the entry. Third, since all digits of an entry are treated alike, there is no need for any device to indicate the position of a digit entered. If the K's in the weighted sum are chosen arbitrarily (rather than in accordance with the rule of weighting characterized by the present invention) this would not be the case. Fourth, the verifying mechanism can be constructed to perform the simple doubling and addition steps discussed previously whereby the resulting mechanism may assume relatively simple mechanical, electromechanical, or electrical configurations; and as a result, the actual verifying mechanism is simple, inexpensive to manufacture, and easily installed and maintained.

It will be recalled that the K's used in the weighted sum $\Sigma KA$, discussed above, were related to one another by the relationship $K_{i+1} = 2K_i - 11$, thus allowing the proving or verifying mechanism to employ a process of doubling, adding, doubling, etc. As a general matter, if the K's had been chosen differently so that $K_{i+1} = cK_i$ minus a possible multiple of 11, and $K_1$ equals $c$, then essentially the same principle of proving the check digit could be used in the mechanism except that instead of adding and doubling, the process could comprise adding and multiplying by the constant $c$. For certain $c$'s, however, there is a loss of error detection ability since the K's do not exhaust the integers 1 through 10. For example, if $c$ equals 10 and $K_1$ equals 10, then $K_2$ equals 1, $K_3$ equals 10, $K_4$ equals 1, $K_5$ equals 10, etc. For $c$ equals 6, 7, or 8, however, ten different K's are still obtained.

It should moreover be noted that the entire preceding discussion has assumed that the system of weighting and the computations relating to the derivation of a check symbol and verification of a number of series thereby, has employed the modulo 11. The number 11, as a practical matter, however, does not play an exclusive role in the selection of check digits; and any prime number greater than the number of keys (which, in the case of a numeric keyboard, is any prime number greater than 10) will suffice. By a prime number is meant an integer divisible only by 1 and by itself.

For example, one could choose the K's such that $K_{i+1} = cK_i$ minus a possible multiple of 13; and we could then require that the check digit to be employed is the smallest integer which when added to the weighted sum $\Sigma KA$ makes the result a multiple of 13 (i.e., the check digit can be the 13's complement of the computed weighted sum). When this alternative number is employed, the same principle of adding and multiplying by $c$ could be employed in the proving or verifying mechanism except that now multiples of 13 are allowed to be dropped or are cast out during formation of the partial sums. It should be noted, however, that since there will now be 13 possible values for the check digit, three extra keys must be added to the numeric keyboard to enter check digits corresponding to the numbers 10, 11 and 12. Similar considerations apply when any other prime number, e.g., 17, 19, 23, etc., is selected.

It should moreover be noted that the system of assigning check digits, and the principle of the proving or verifying mechanisms discussed above, can easily be generalized to accommodate any type of keyboard. Thus, the keyboard can be numeric, alphabetic, mixed alphabetic and numeric, and may even include uncommon symbol keys. These particular forms of keyboards can then be employed by simply assigning the integers 0, 1, 2, etc., in some fashion to the different keys, and by then choosing, as the number base, a prime number P greater than or equal to the number of keys. The weights K are still fixed as before according to the rule $K_{i+1}=cK_i$ minus a possible multiple $m$ of P, with $K_1$ equal to $c$ itself. The check symbol of the entry $S_nS_{n-1}$ * * * $S_1$ is then designated as that symbol whose assigned key number will make the weighted sum of the entry equal to a multiple $m$ of P (i.e., the check symbol is the P's complement of the computed weighted sum). It will be noted, however, that if P is greater than the original number of keys, it will be necessary, as mentioned previously, to add special check symbol keys.

In the case of numeric keyboards, the choice of the check digit was made equal to the smallest integer which when added to $\Sigma KA$ makes this sum a multiple of 11. This choice was made to allow simplicity in the design of the verifying mechanism in that a final result of zero of the mechanism is the indication of a proper entry and a nonzero result indicates an error. Calling this choice of check digit $A_0$ for an entry $A_nA_{n-1}$ * * * $A_1$, a possible alternate choice of check digit (say $A_0'$) is: $A_0'=A_0+d$, where $d$ is a fixed integer chosen from 1 to 10, the above addition to be, of course, performed in radix or modulo 11.

This method of choosing check digits affects the verifying mechanism only to the extent that the final result, instead of always being zero, is $2d$ (doubling of the check digit entry doubles $d$), and a non-$2d$ result indicates an error.

A similar generalization applied to the case of the generalized keyboard, with arithmetic performed in modulo P, except that $d$ can be chosen from 1, 2 * * * $P-2$, $P-1$. Indeed, a similar generalization applied to multiplying by $c$, except that the final (i.e., correct) result is now $cd$.

It has been implied in the foregoing discussion that the keyboard is not full bank, i.e., that it does not have a separate row of keys for each symbol position, as in desk calculating machines. This latter type of keyboard can also be protected against errors, however, except that here an extra set of keys must be added for the check symbol, and some device should be included in the proving or verifying mechanism which will switch its input in proper sequence through the different sets of depressed keys.

It will also be noted that while the mechanisms discussed above have been termed check digit verifiers and have been mentioned as operative to accept a series of numbers, including a check digit, to determine whether or not the number is correct, the verifiers of the present invention can easily be converted to actually compute and indicate what the check digit for a given input series of numbers should be. Indeed, as will become apparent from the subsequent discussion, the check digit verifiers of the present invention, as they operate, form the weighted sum of the input numbers; and this weighted sum can merely be computed, whereafter the mechanism can then signal just what the proper check symbol for the input series should be.

It is accordingly an object of the present invention to provide improved methods of forming and verifying check digits.

Another object of the present invention resides in improved structures which, when given a series of numbers, will generate a digit whose value will change if any one number of the series is altered or if transposition is made of any two numbers in the series.

Still another object of the present invention resides in the provision of improved check digit verifiers adapted to compute a check digit from a given series of numbers, and adapted to compare the check digit so computed with a previously computed check digit to determine if an error has been made in the series.

Still another object of the present invention resides in the provision of a method of forming a check digit which is simple and is readily susceptible to simple and accurate mechanization.

Another object of the present invention resides in the provision of both mechanical and electrical check digit verifiers which are simple in construction, and efficient and rapid in operation.

A further object of the present invention resides in the provision of check digit verification systems adapted to exhibit a high percentage of error detection.

In providing for the foregoing objects and advantages, the present invention contemplates the formation and utilization of check digits computed by a modulo P check system, where P is any prime number greater than the number of different characters to be represented; and the P chosen for purposes of illustration hereinafter is 11. The particular method of computation employed is as follows: Given a series of numbers, which series may be of any length, the most significant digit in the series is first doubled. The next most significant digit is then added to this doubled quantity and the result is again doubled. The resulting doubled quantity is thereafter increased by the third most significant digit whereafter the resulting sum is doubled again, etc. In short, each number of the series, commencing with the most significant digit thereof, is added and then the result doubled, added to the next most significant digit, the resulting sum doubled again, etc. This "doubling" procedure must again be understood to comprise merely a preferred form of the present invention, given for purposes of illustration and, in accordance with the preceding discussion, it will be appreciated by those skilled in the art that rather than using a common multiplier 2 (or doubling), other common multipliers $c$ can be employed.

If at any time the partial result occurring by reason of a doubling (or common multiplying) or addition step exceeds the number P (peferably 11), P is subtracted from the number (i.e., the system contemplates a "casting out" of P's) with the process continuing with the remainder. The process thus described of adding and multiplying digits of the original number is continued for all of the digits; and the final check digit of the process is chosen to be the P's complement of the final result of the aforementioned addition and multiplying process.

Whenever the original series of numbers is to be employed during a computation or other procedure associated with that series of numbers, the series and its accompanying check digit is fed into a check digit verifier which is adapted to compute a check digit corresponding to the original series of numbers and adapted to further compare the check digit so computed with the check digit accompanying this original series of numbers. If the computed digit and accompanying check digit differ from one another, this, of course, indicates that an error has occurred somewhere in connection with the number being operated upon, wherefore this number is rejected until the nature of the error can be found.

The foregoing objects, advantages, construction and operation of the present invention will become more readily apparent from the following description and accompanying drawings in which.

Figure 1:
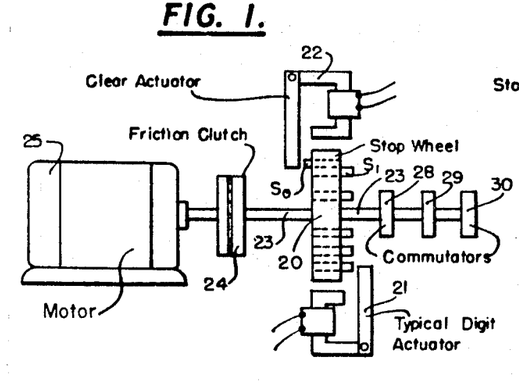
FIGURE 1 is an illustrative representation of a simple electromechanical check digit vertifier constructed in accordance with the present invention.
Figure 2:
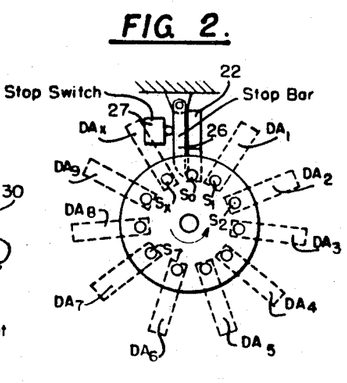
FIGURE 2 illustrates a portion of the structure shown in FIGURE 1.
Figure 3:
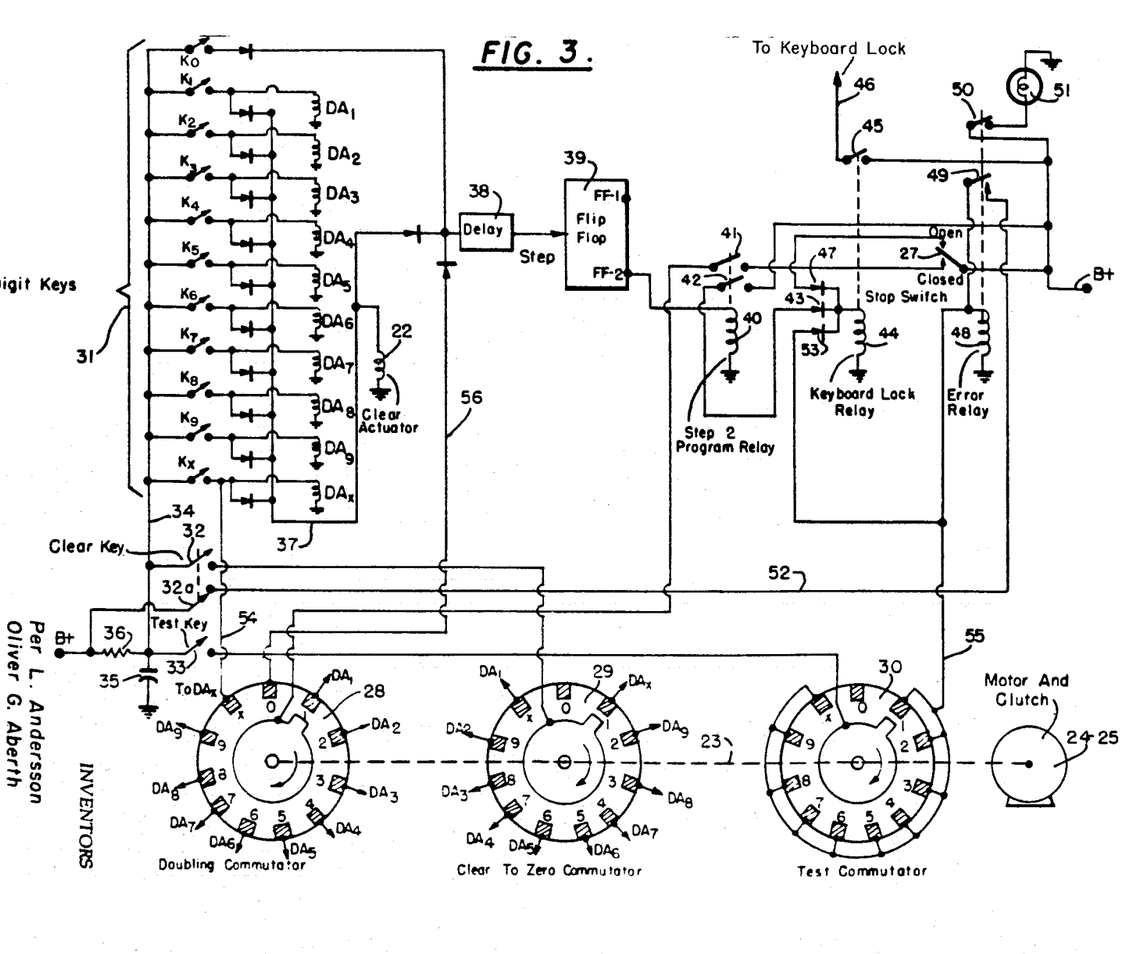
FIGURE 3 is a schematic diagram of the check digit verifier structure shown in FIGURES 1 and 2, illustrating the various electrical circuits which are associated with the mechanical structure of FIGURES 1 and 2.

Referring first to the check digit verifier shown in FIGURES 1 through 3, it will be recalled that a check digit for any number may be computed by entering the first digit of the number, i.e., the most significant digit, into a modulo 11 counter, then doubling this number, adding thereto the second digit of the original series, again doubling the sum, adding to the resultant doubled number the third digit of the series, etc. It is well known that a counter is a device capable of changing from one to the next of a sequence of distinguishable states upon each receipt of a discrete input signal. A scale of eleven counter involved in the modulo 11 counter may be defined as a device which can absorb eleven counts before recycling. These operations are, as also mentioned, performed in modulo 11 (i.e., modulo P where P is the prime number previously mentioned) with all carries being neglected; and if the computation is performed on a series with its associated check digit, the resultant of the overall computation should produce a final number of zero.

The arrangement of FIGURES 1 through 3 performs this check digit computation and verification through the use of an accumulator wheel 20 which has a series of eleven settable "stops" $S_0$ through $S_x$, inclusive (see FIGURE 2), arranged equidistant around the periphery thereof. These stops $S_0$ through $S_x$ are similar to the stops on an adding machine add rack, and are slidably mounted in respective holes in the accumulator wheel 20 whereby the stops may be individually moved to positions wherein they project from one or the other side of the wheel 20. Ten of the stops $S_1$ through $S_x$ (excluding the zero stop $S_0$) are associated with a total of ten digit actuators $DA_1$ through $DA_x$ located adjacent one side of the accumulator or stop wheel 20; and a typical such digit actuator has been designated 21 in FIGURE 1.

The actual positions of the ten digit actuators, in relation to their associated stop positions, have been illustrated in broken line in FIGURE 2. The several digit actuators $DA_1$ through $DA_x$ are fixed in position, and are individually connected to a corresponding digit key, with this connection being direct for a ten-key keyboard, or through an appropriate distributor when a full keyboard is to be employed. Depression of a given key will accordingly energize its associated digit actuator whereby the actuator so energized will "set" the stop which is disposed adjacent that digit actuator. This operation and its significance will become more readily apparent subsequently.

In addition to the ten-digit actuators $DA_1$ through $DA_x$, inclusive, a "clear" actuator 22 is provided adjacent a stop bar 26 (see FIGURE 2) located on one side of the wheel 20. This particular clear actuator, as illustrated in FIGURE 1, is adapted to move the stop engaging stop bar 26 through the wheel 20 in a direction opposite to that effected by energization of a digit actuator such as 21. It will be appreciated, therefore, that energization of a digit actuator tends to move a stop to a position wherein it projects from one side of the wheel (i.e., the left side, in FIGURE 1); while energization of clear actuator 22 tends to move a stop to a position wherein it projects from the opposite side of the wheel 20 (i.e., from the right side in FIGURE 1). Any stop which is projecting outwardly to the left of wheel 20 (e.g., stop $S_0$ in FIGURE 1) is accordingly said to be "set," while any stop which projects from the right side of the wheel 20 (e.g., stop $S_1$ in FIGURE 1) is said to be "cleared." The accumulator is said to be cleared or in a zero position when the $S_0$ stop pin has been set whereby this pin bears against the stop bar 26.

The accumulator wheel 20 is coupled via a shaft 23 and friction clutch 24 to a motor 25 whereby, in the absence of other considerations, the wheel 20 will tend to constantly rotate. As a matter of practice, however, the stop bar 26 associated with a stop switch 27 (see FIGURE 2) is located on the left side of the wheel as viewed in FIGURE 1 whereby any pin which is set is caused to bear upon the stop bar 26 thereby preventing further rotation of the wheel 20. In the initial setup of the device, therefore, the stop $S_0$ is set, while all of the other stops are cleared, with the result that drive from the motor 25 merely causes friction clutch 24 to slip, with the wheel 20 remaining stationary at its home position until the zero stop is cleared by actuator 22, and one of the other stops is set by an appropriate actuator $DA_1$ through $DA_x$. Clearing of the zero stop and setting of another stop through energization of the clear actuator 22 and a selected digit actuator 21, will thereafter cause the wheel 20 to rotate until the newly set stop impinges upon stop bar 26 to halt rotation of wheel 20; and any vibration occurring during this halting will be damped out by friction clutch 24.

The accumulator wheel 20 is further associated with a series of commutators 28, 29 and 30 carried by shaft 23, which will be described with greater particularity in reference to FIGURE 3. These commutators, however, provide a clearing and testing system, and also a means of doubling the number in the accumulator wheel 20. As will be described, a two-step programmer of flip-flop is employed in conjunction with the mechanical components shown in FIGURES 1 and 2 to perform the required doubling operation; and the input of this two-step programmer is connected either through switches or diodes to all of the digit keys as well as to a clear key, in the aforementioned keyboard.

Reference is now made to FIGURE 3 for a more detailed description of the actual operation of the check digit verifier shown in FIGURES 1 and 2. The keyboard mentioned previously is designated 31 and has been assumed, for purposes of simplicity in discussion, to comprise a ten-key keyboard rather than a full keyboard. The ten keys have been designated respectively as $K_0$ through $K_9$, inclusive. In addition, the keyboard 31 includes a further key $K_x$ adapted to enter a digit $x$ (i.e., corresponding to a numeral 10 when the modulo 11 form of checking is utilized); and the keyboard further includes a clear key 32 (which is internally ganged to a control switch 32a), and a test key 33.

The several keys $K_0$ through $K_x$, 32 and 33 are connected to a common line 34 which is in turn coupled to a capacitor 35. Capacitor 35 is charged via a resistor 36 coupled to a source of B+; and the charge thus produced on capacitor 35 is used as an energizing source for the several keys $K_1$ through $K_x$, 32 and 33. The value of resistor 36 is chosen to be sufficiently high so that any current flowing through the resistor 36 to line 34 will be insufficient to pull in the various digit and clear actuators, to be discussed. Thus, the actual energization of the several keys is derived from the voltage developed across capacitor 35 after a sufficient charge time has elapsed, and this voltage is applied as a pulse of energy via a selected key when that key is depressed. This form of capacitive source is preferably employed to assure that no errors can occur due to an operator holding a key depressed for a relatively long period of time; and as a matter of practice, once a key is depressed and held in depressed position, the capacitor 35 will discharge through the key so depressed, whereafter, so long as the key remains depressed, capacitor 35 will be effectively short-circuited by the clear actuator and digit actuator coils (to be discussed) associated with the depressed key.

While some current leakage will occur via resistor 36 while the key remains depressed, this current leakage, as mentioned, is insufficient to again operate the actuators associated with the depressed key; and the capacitor 35 will be unable to recharge to a voltage sufficient to effect such digit and/or clear actuator energization until the key is released.

The several keys $K_1$ through $K_x$ are connected, as illustrated, to the coils of digit actuators $DA_1$ through $DA_x$, inclusive; and are also connected, for example, via diodes, to a common bus 37 coupled to the coil of clear actuator 22. Bus 37 is also coupled via a further diode and via a delay element 38 to the step input of a two-step programmer which, in the embodiment of FIGURE 3, has been illustrated as a flip-flop 39. Flip-flop 39 is capable of assuming either of two stable states, designated in FIGURE 3 as states FF–1 and FF–2 respectively. When the flip-flop 39 is in its state FF–2, the output thereof energizes a two-step program relay 40 having a pair of normally open contacts 41 and 42. Contact 41 is, as illustrated, coupled to one terminal of the single pole-double throw stop switch 27 (see FIGURE 2) whereby when stop switch 27 is closed (as a result of a set stop bearing upon stop bar 26), a circuit will be completed from B+ through switch 27 and thence via relay contact 41 (assuming that the relay 40 is energized) to the rotor of commutator 28, the "doubling commutator."

When relay 40 is energized, moreover, a circuit is also completed from B+ via contact 42 thereof through a diode 43 to a keyboard lock relay 44 having a normally open contact 45. Energization of the keyboard lock relay 44 supplies B+ via contact 45 to a line 46 which is in turn connected to the keyboard lock, thereby serving to prevent depression of any of the keys in the keyboard 31. Another input to the keyboard lock relay is derived via a diode 47 from B+ via the stop switch 27, when switch 27 is in its open position (i.e., no set stop is bearing upon stop bar 26). As a result, the keyboard lock relay 44 will, as will become apparent from the subsequent discussion, be de-energized to permit the depression of keys in keyboard 31, unless the two-step programmer flip-flop 39 is in step FF–2 (at which time, as will become apparent, a doubling operation is in progress), or unless stop switch 27 is in its open position (at which time the accumulator or stop wheel 20 is in actual rotation).

The keyboard lock relay 44 will also be energized to lock the keyboard whenever an error occurs during the check digit verification. In particular, an error relay 48 is provided which has a pair of normally open contacts 49 and 50. Contact 50 permits energization of an error lamp 51 from B+ whenever error relay 48 is energized. Similarly, whenever error relay 48 is energized, a circuit is completed from B+ via normally closed switch 32a of the clear key, through bus 52, closed contact 49 of error relay 48, and thence via diode 53 to the keyboard lock relay 44, thereby locking the keyboard upon occurrence of an error and preventing any further steps of digit entry until the error has been cleared. Relay contact 49 also acts as a holding contact for error relay 48 whereby once the error relay 48 is energized from the test commutator 30 (in the manner to be described), it will light error lamp 51 and lock the keyboard until subsequent depression of clear key 32 opens its ganged switch portion 32a.

The commutator 28, as mentioned previously, is the "doubling commutator." Commutator 28 comprises a rotor which is selectively energized from B+ via the aforementioned contact 41 and stop switch 27; and also includes a total of eleven stator positions. Ten positions 1 through $x$ inclusive of these eleven stator positions are connected to correspondingly numbered digit actuators $DA_1$ through $DA_x$ inclusive; and one typical such connection has been shown as line 54 between stator position $x$ of commutator 28 and the coil of digit actuator $DA_x$. The zero position of commutator 28 is coupled via a further diode to the input of delay means 38 and thence to the step input of flip-flop 39; and this zero position provides a pulse input to flip-flop 39 under certain circumstances of the clearing technique to be described subsequently.

The commutator 29 comprises a "clear-to-zero" commutator; and this commutator also includes a rotor and a total of eleven stator positions. The rotor of commutator 29 is coupled via clear key 32 to capacitor 35 whereby a pulse is applied to commutator 29 whenever the clear key is depressed. Stator positions 1 through $x$ of the clear-to-zero commutator are coupled to the coils of the digit actuators numbered complementary to the corresponding stator positions of commutator 29, i.e., position 1 of commutator 29 is coupled to digit actuator $DA_x$; position 2 of commutator 29 is coupled to digit actuator $DA_9$, etc. As a result, whenever the rotor of commutator 29 is in a position other than zero, depression of the clear key will act to energize an appropriate digit actuator thereby to set up a stop key which is an 11's complement distance away from the actual stop at the home position of wheel 20 immediately prior to the clearing operation, whereby the wheel 20 is permitted to rotate until its zero stop is at the home position.

The third commutator 30 comprises a "test" commutator, and has a rotor which is energized via test key 33 from capacitor source 35. Commutator 30 again includes eleven stator positions 0 through $x$ inclusive, and ten of these positions 1 through $x$ inclusive, are interconnected to one another and thence, via a line 55, to the aforementioned error relay 48. If, therefore, upon depression of the test key 33, the rotor of commutator 30 is anywhere other than at its zero position, a pulse will be applied to the error relay 48 whereafter the keyboard lock relay 44 will be energized to lock the keyboard, holding contact 49 will be closed to maintain the error relay energized, and relay contact 50 will be closed to energize lamp 51.

The actual operation of the overall structure will become apparent from a detailed consideration of an assumed sequence. Let us initially assume that the wheel 20 is somewhere off of its home position, i.e., the single set stop on the wheel is something other that the zero stop $S_0$. This situation, of course, will arise when the verifier is to be used for the first time as well as whenever an error has been detected during prior use of the mechanism. Before entering a number to be verified into the keyboard 31, the clear key 32 is first depressed. (It should be noted that the clear key 32 is not locked by the keyboard lock coupled to line 46 but is independent of the remaining keys in keyboard 31.) The depression of clear-key 32 first opens normally closed switch 32a, ganged thereto, thereby de-energizing error relay 48. At the same time, a pulse is drawn from capacitor 35 via closed clear key 32 to the rotor of clear-to-zero commutator 29. Since it is assumed that this rotor is, under these initial conditions, at some position other than zero, the pulse so coupled to the rotor of commutator 29 will be coupled to a complementary numbered digit actuator, such as $DA_x$ for the particular position of components illustrated in FIGURE 3.

The pulse so coupled to actuator coil $DA_x$ will accordingly set the stop which is $x$ (i.e., 10) units away from the actual stop at the home position; and this pulse will also be coupled via line 37 to clear actuator 22 to clear the stop at the home position. The pulse so appearing on line 37 will also be coupled via delay line 38 to the step input of flip-flop 39 to jam the flip-flop to, for example, its position FF–2 thereby energizing relay 40 and closing contacts 41 and 42.

Since the stop at the home position has now been cleared, motor 25 will effect drive via clutch 24 and shaft 23 to stop wheel 20 whereby stop wheel 20 will rotate until the newly set up stop impinges upon the stop bar 26. It will be appreciated that since the digit actuator which was actually energized during the clearing operation is the 11's complement number of positions away from the actual stop at the home position prior to the clearing operation, the stop which is thus set up as a result of a pulse being coupled out of commutator 29, will always be stop $S_0$. Accordingly, wheel 20 will rotate until stop $S_0$ impinges upon stop bar 26, whereafter stop bar 26 will halt further rotation of wheel 20 and will close stop switch 27. When stop switch 27 is closed, voltage is coupled from B+ via the now closed contact of switch 27, through the closed contact 41 of relay 40 to the rotor of commutator 28; and inasmuch as this commutator rotor is now also in its zero position due to prior rotation of wheel 20, the voltage so appearing on the rotor of commutator 28 will be coupled via line 56 and delay means 38 to the step input of flip-flop 39 whereby this flip-flop will be stepped back to its position FF-1.

Summarizing the foregoing operation therefore, depression of the clear key 32 will cause the $S_0$ stop on wheel 20 to be set, will clear any other stop which is set on the wheel, will cause the wheel to rotate to a position wherein the $S_0$ stop is in contact with stop bar 26 thereby setting all of the commutators to their zero position, and will set the two-step programmer flip-flop 39 to its flip-flop position FF-1. The device is now ready for entry of numbers to be checked.

The operator now punches the keyboard 31 to enter the first digit of the input number series. By way of example, let us assume that this first number is a "3," whereby the operator would punch key $K_3$. Depression of $K_3$ will draw a pulse from capacitor 35 through $K_3$ to digit actuator $DA_3$, thereby setting stop $S_3$. This same pulse will also be coupled via bus 37 to clear-actuator 22 thereby to "clear" stop $S_0$; and will be coupled via delay means 38 to flip-flop 39 to set the flip-flop to its position FF-2 thereby to energize relay 40. The wheel 20 will now rotate until stop $S_3$ impinges upon stop bar 26. During the rotation of the wheel toward this stopped position, switch 27 will be open whereby the keyboard lock relay 44 is energized from B+ via diode 47 and the said open switch 27 to prevent the further entry of any digits into the keyboard.

Once the stop $S_3$ impinges upon the stop bar 26, switch 27 is closed thereby completing a circuit from B+ via relay contact 41 (which is now closed, due to energization of relay 40, in the FF-2 position of flip-flop 39), to the rotor of doubling commutator 28. This rotor will now be opposite position 3 of commutator 28 thereby sending a further pulse to digit actuator $DA_3$. It will be appreciated, however, that due to the rotation of wheel 20, the stop which is actually opposite digit actuator $DA_3$ at this time will now be stop $S_6$, whereby the pulse so coupled to digit actuator $DA_3$ will set stop $S_6$ and will clear the stop at the home position, namely stop $S_3$, to permit rotation of the wheel until stop $S_6$ impinges upon stop bar 26. During this doubling operation, the step-two program relay 40 is, of course, energized whereby voltage is still applied via closed contact 42 and diode 43 to the keyboard lock relay 44, preventing any further entry of digits.

The pulse appearing on line 37 during the doubling operation, in addition to being coupled to the clear actuator and appropriate digit actuator, is coupled as well via delay means 38 to flip-flop 39 to reset the two-step programmer flip-flop to its FF-1 position; but the delay means 38 assures that a sufficient time elapses before the reset of flip-flop 39 to permit the doubling operation to actually occur so that the keyboard lock relay 44 is not de-energized to permit the erroneous entry of numbers into the keyboard at undesired times.

Once the newly set up stop, e.g., $S_6$ impinges upon stop bar 26, switch 27 will again be closed. However, this further closure of switch 27 will not effect anymore of the previously described operation since flip-flop 39 has now been reset to its FF-1 position whereby relay 40 is de-energized; and accordingly, the closure of switch 27 will not couple a further pulse to the doubling commutator 28. As a result of the foregoing therefore, the punching of the digit key, such as $K_3$, results in an entry of the number "3" into the keyboard and causes this number to be automatically doubled to "6" whereafter the device comes to rest; and during this doubling operation, no further numbers can be entered.

The second number in the sequence is now entered. If we should assume for this example that this number is a "2," key $K_2$ will now be depressed to energize actuator $DA_2$. The actuator $DA_2$, being two positions away from the home position of the stop wheel 20, will now actually set stop $S_8$ (since stop $S_6$ is at the home position under the previously assumed sequence). Accordingly, the entry of the second number results in this number being added to the previously entered and doubled number thereby to store the number "8." Entry of the second number, as before, also clears the number at the home position (i.e., stop $S_6$ in the assumed example), locks the keyboard against entry of further numbers, and causes the new number, e.g., "8," in the accumulator wheel to be doubled, whereafter the device comes to rest preparatory to reception of a third digit. Since there are only eleven stop positions cyclically distributed about stop wheel 20, the doubling of the number "8" causes the stop wheel to come to rest with stop $S_5$ in contact with stop bar 26. In short, the movement of wheel 20 automatically results in a casting-out of the number "11"; and such a casting-out occurs whenever an addition or doubling step seeks to produce a result equal to or greater than "11."

The foregoing sequence will, of course, be continued for all of the numbers in the number sequence being checked; and as each number is entered, it is added automatically to the doubled result of the previous computation, whereafter this new number is further doubled. If a simple series of numbers is entered into the keyboard without regard to the entry of a check digit, it will be appreciated, therefore, that after the number is completely entered the accumulator disk 20 will be at a position which corresponds to the weighted sum of the digits, using the system of weighting discussed previously. This position of the accumulator wheel could thereafter be employed to energize an appropriate indicator thereby indicating the actual check digit corresponding to the numbers so entered.

In accordance with a preferred embodiment of the invention, however, it is assumed that the number sequence being entered includes a check digit; and it is further assumed, in accordance with the discussion previously given, that this check digit is the P's complement (actually, in our present example, the 11's complement) of the weighted sum of the original series. Accordingly, when this 11's complement check digit is entered in the keyboard, the accumulator wheel 20 should come to rest at a zero position, i.e., the $S_0$ stop should be in contact with the stop bar 26 and all of the commutators should be at their zero positions. If an error has occurred, however, this will not be the case; and the commutators, particularly test commutator 30, will be off of zero position.

After the number series has been entered, therefore, the test key 33 is depressed to check the accuracy of the number so entered. If test commutator 30 is at its zero position, this depression of key 33 will have no effect whatsoever on the system. If, however, the test commutator 30 is somewhere other than at its zero position, depression of key 33 will draw a pulse from capacitor 35 and will couple this pulse via line 55 to the error relay 48. Energization of error relay 48 will accordingly close contact 50 to energize the error lamp and will also temporarily close contact 49. Closure of contact 49 completes a circuit from B+ via the normally closed contact 32a of the clear key, and thence via line 52, closed contact 49 and error relay 48 to hold the error relay in its energized state. At the same time, the closure and holding of error relay contact 49 will cause a voltage to be coupled via diode 53 to keyboard lock relay 44 whereby locking the keyboard and preventing any further entry of digits until the verifier is intentially cleared, by depression of clear key 32.

It will be appreciated from the foregoing discussion that the fairly simple electromechanical arrangement discussed in reference to FIGURES 1 through 3 operates in accordance with the mathematical concepts already discussed, and performs accurate check digit verification in an extremely simple, rapid and reliable manner. It will moreover be appreciated that various modifications can be made in the circuits and structure described without departing from the concepts of the invention. By way of example, certain additional refinements can be added to the circuit of FIGURE 3 to prevent error due to other possible contingencies. One such additional refinement contemplates that a pin may be placed near the stop $S_1$ on the accumulator wheel 20 to open a normally closed switch as said pin passes this switch. This addition of a pin to the accumulator wheel can assure for example that the machine is not jammed at zero; for it will be appreciated that if, through some circumstance, the accumulator wheel 20 is not rotating at all during the entry of the various digits into the keyboard (e.g., due to breakdown of clutch 24), no error will be detected. A relay can, in accordance with this refinement, be employed in conjunction with the previously mentioned pin and switch; and this relay can be such that depressing of the test key on the keyboard, or passing of the "home" distributor position on a full keyboard, closes the relay which thereafter holds itself in closed state. If the test key is depressed (or "home" is passed) when the relay is already closed, the keyboard will lock. On the other hand, when the pin near the stop $S_1$ opens the aforementioned normally closed switch, it can release the relay, allowing the keyboard to remain open when the test key is depressed.

In short, an additional input to the keyboard lock relay can be provided which is so arranged with respect to the accumulator wheel that if, through any circumstance, the wheel 20 does not move during the entry of numbers into the keyboard, the keyboard will lock itself thereby signifying some malfunction of the device. As a practical matter, positioning of the pin adjacent the stop $S_1$ will constitute an effective check on the operation of the machine, since the entry of any number (other than a series of zeros) will cause the accumulator wheel to move forward at least two spaces. Still other refinements will be suggested from the preceding discussion.

The entire foregoing discussion relating to FIGURES 1 through 3 has been concerned with an electromechanical check digit verifier or check digit calculator. In accordance with another embodiment of the present invention, however, a purely electrical system, utilizing for example a relay matrix, can be employed. Such an alternative form of the invention is illustrated in FIGURES 4 and 5, and as will be appreciated from the subsequent discussion, the operation of this relay embodiment of the invention is directly analogous to the operation of the electromechanical system already described.

Figure 4:
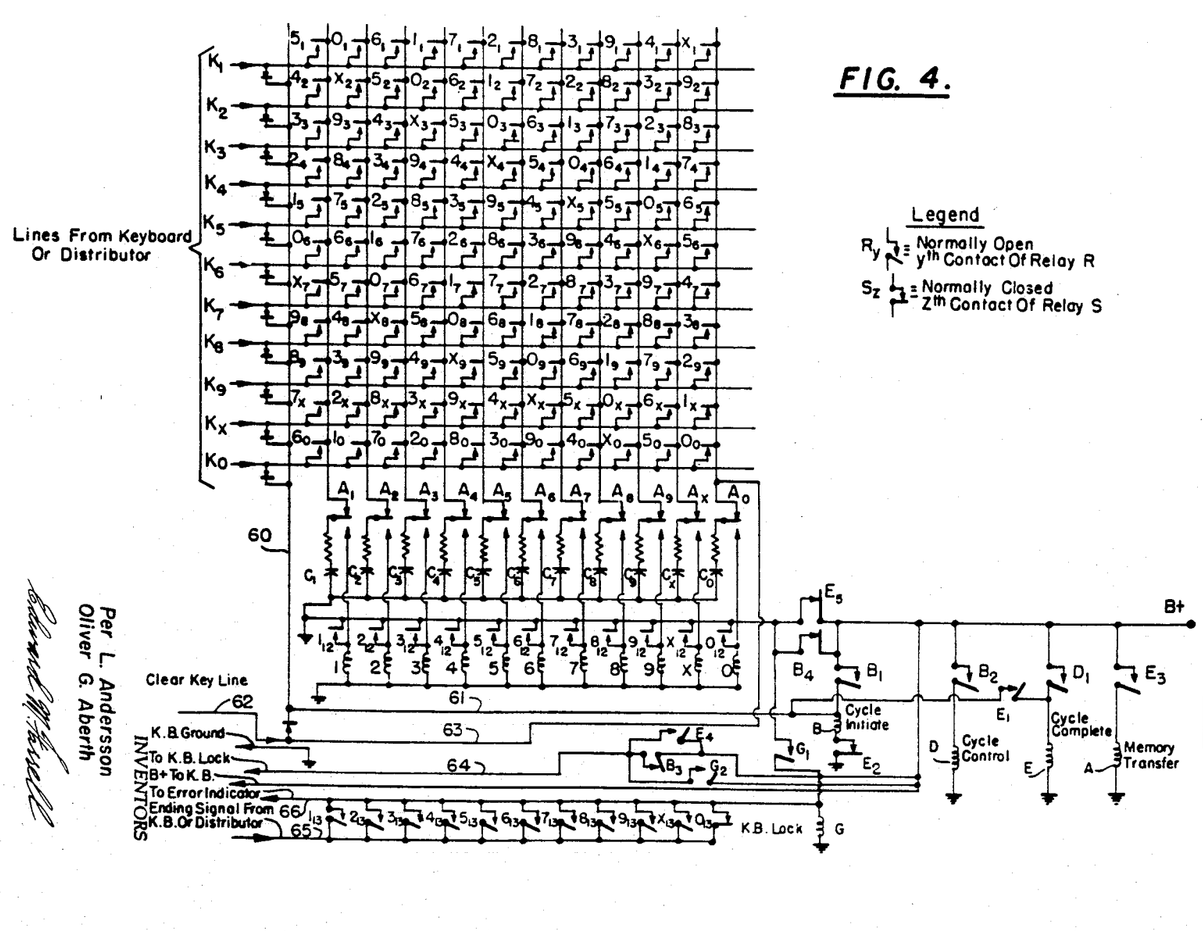
FIGURE 4 is a schematic diagram illustrating an alternative form of check digit verifier constructed in accordance with the present invention and utilizing relays in place of the electromechanical arrangement shown in FIGURES 1 through 3.
Figure 5:
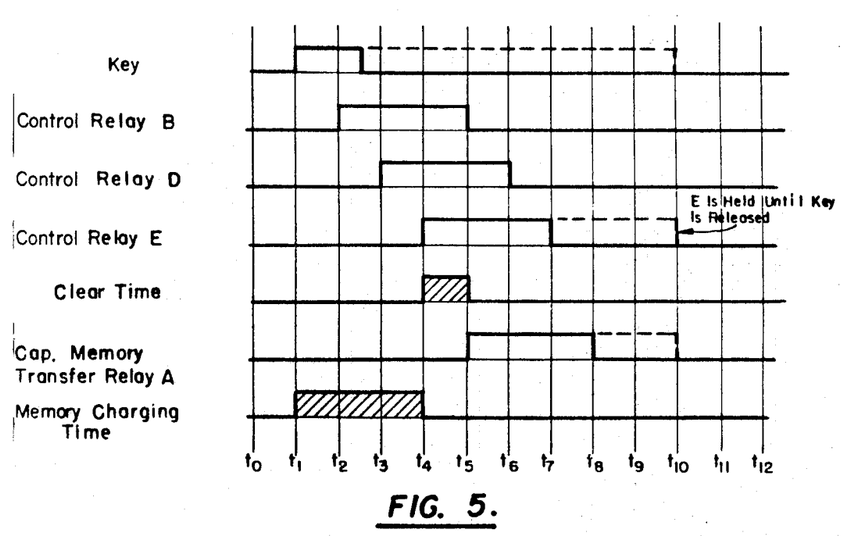
FIGURE 5 is a timing diagram illustrating the operation of FIGURE 4.

Referring in particular to FIGURES 4 and 5, it will be seen that the system comprises a total of eleven digit relays 1, 2, 3, \* \* \* $x$, 0, inclusive. Each of these relays has a total of thirteen contacts, some of which may be normally open and some of which may be normally closed, in accordance with the legend given in FIGURE 4. Eleven of these contacts on the eleven relays 1 through 0, inclusive, are interconnected in a matrix, illustrated in the upper portion of FIGURE 4; and for purposes of simplicity, it will be noted that each of these contacts is normally open and that the contacts are accompanied by legends which identify both the number of the contact and the number of the relay involved. By way of example, the first horizontal line of the matrix comprises the first contact of the relays 5, 0, 6, 1, 7, 2, 8, 3, 9, 4 and $x$, in that order. Similarly, the second horizontal line of the matrix comprises the second contact of each of the relays 4, $x$, 5, 0, 6, 1, 7, 2, 8, 3 and 9, in that sequence. The other portions of the matrix are similarly identified.

The matrix is coupled, as was the case in the arrangement of FIGURES 1 through 3, to a total of eleven keys (not shown) comprising a keyboard. The output lines from the keys have been designated as $K_1$ through $K_0$ inclusive. Each key is coupled to a horizontal line of the matrix and is also coupled to a common control line 60 associated with the overall system. Accordingly, depression of any one of the keys will couple a pulse to the corresponding horizontal line in the matrix, and will also couple this pulse (or a voltage, since the pulse energization considerations of the FIGURE 3 embodiment no longer are essential), via line 60 and thence via a line 61 to a "cycle-initiate" relay B. Several other relays are utilized, and these have been designated respectively as the "cycle-control" relay D, the "cycle-complete" relay E and the "memory-transfer" relay A; and each of these relays A through E inclusive also includes normally closed and normally open contacts which are identified by legends similar to those employed in conjunction with the relay contact matrix already discussed.

The vertical lines of the relay contact matrix are connected via normally closed contacts of the memory transfer relay A, designated contacts $A_1$ through $A_0$ inclusive, to a plurality of capacitors $C_1$ through $C_0$ inclusive, whereby closure of a relay contact in the matrix will, as will be described, cause a pulse to be stored in a selected one of the several capacitors $C_1$ through $C_0$ so long as memory transfer relay A is not energized. Upon energization of memory transfer relay A, the switch portions of the several contacts $A_1$ through $A_0$ inclusive, will move downward to close normally open portions of the contacts $A_1$ through $A_0$, inclusive, thereby to transfer the pulse stored in the capacitor to an appropriate digit relay 1 through 0 inclusive.

A clear key line 62 energized by a clear key on the keyboard is also provided whereby depression of this clear key energizes the aforementioned line 61 and also energizes a line 63 which is coupled to the normally closed portion of the $A_0$ contact. A series of other relay contacts $B_3$, $E_4$, and $G_2$ are interconnected to a line 64 coupled to the keyboard lock. The 12th contact of the several digit relays 1 through 0, designated respectively $1_{12}$ through $0_{12}$, inclusive, are interconnected to the digit relays 1 through 0 inclusive as holding contacts; and the 13th contact of the several relays 1 through 0, designated $1_{13}$ through $0_{13}$, inclusive, are interconnected to lines 65 and 66 to provide appropriate error indications.

The actual nature of the circuit shown in FIGURE 4 will perhaps best be appreciated by examining the operation of the components and the several relays shown. FIGURE 5 is a timing diagram showing the time of the various relays during an assumed period of time $t_0$ through $t_{12}$ inclusive; and this diagram is referred to as illustrating the actual times of pull-in and drop-out of the several relays. As a practical matter, however, the invention may best be understood by an assumed sequence of operation.

The first step, of course, in utilizing the check digit verifier of FIGURE 4 is to clear the verifier preparatory to the entry of a number sequence. The clear key is accordingly depressed at a time designated $t_1$ (see FIGURE 5), whereby a voltage is coupled via line 62 to line 61 and thence to the cycle initiate relay B. Relay B is accordingly energized, and at time $t_2$ this relay pulls down through normally closed contact $E_2$ of relay E. This action closes normally open contacts $B_1$, $B_2$, and $B_3$ and opens closed contact $B_4$. Closing relay contact $B_1$ acts as a holding contact for relay B. Closing contact $B_2$ energizes relay D which in turn pulls down at time $t_3$. Since relay B is held in by contact $B_1$, contact $B_2$ likewise holds in the cycle-control relay D. Closing contact $D_1$ of relay D thereafter completes a circuit to the cycle complete relay E, closing relay contact $E_3$ at time $t_4$. Closing contact $E_3$ causes relay A to pull down at time $t_5$. Energization of relay E also opens normally closed contact $E_2$ thereby dropping out cycle-initiate relay B at time $t_5$, and the subsequent opening of contact $B_2$ drops out cycle control relay D at time $t_6$.

As a result of depression of the clear key, therefore, and after the aforementioned sequence has occurred, memory transfer relay A will be energized so long as relay E is held in; and relay E will in turn be held in through contact $E_1$ and line 61 as long as the clear line 61 is excited.

At the same time that the preceding sequence of operations is proceeding, depression of clear key 62 applies a voltage via line 63 and thence via the normally closed contact $A_0$ of relay A to capacitor $C_0$, thereby storing a charge in capacitor $C_0$. After relay E is pulled in, and before relay B drops out (i.e., during the clear time $t_4$ to $t_5$, indicated in FIGURE 5), both of normally closed relay contacts $E_5$ and $B_4$ will be open. As will become apparent from the subsequent discussion, these two contacts $E_5$ and $B_4$ act to supply holding power from B+ and thence via selected ones of the holding contacts $1_{12}$ through $0_{12}$, inclusive, to the several digit relays 1 through 0, inclusive. However, during the clear time $t_4$ to $t_5$, mentioned previously, the opening of both of relay contacts $E_5$ and $B_4$ prevents any such holding power from being applied to any of the relays 1 through 0 whereby the entire digit relay band comprising relays 1 through 0 is cleared, i.e., none of the relays 1 through 0 are energized.

After the digit relays have all been cleared during the interval from $t_4$ to $t_5$, memory transfer relay A is energized at time $t_5$, and contact $A_0$ thereof moves to open the upper normally closed part thereof, and to close the lower normally open part thereof. It will be recalled that prior to energization of memory transfer relay A, a charge was stored in capacitor $C_0$; and accordingly, upon energization of relay A this charge is transferred from capacitor $C_0$ to digit relay 0. Relay 0 is accordingly energized to close holding contact $0_{12}$ and this contact, in association with the now normally closed contact $B_4$, assures that digit relay 0 is held in energized condition.

When the clear key is released, both relays E and A drop out, with the final result that only digit relay 0 is energized. Summarizing the clear operation, therefore, it will be noted that regardless of the previous status of the network shown in FIGURE 4, depression of the clear key ultimately assures that only digit relay 0 is energized, whereby only contacts $0_1$, $0_2$ * * * $0_x$, $0_0$, inclusive, are closed in the relay contact matrix shown in the upper portion of FIGURE 4. We are now ready to enter the first digit of the digit sequence to be checked.

As will be appreciated from the arrangement shown in FIGURE 4, once the first digit is entered by depression of its corresponding digit key, a circuit will be completed through the 0 relay contact associated with the matrix line of the depressed key to an appropriate one of the storage capacitors $C_1$ through $C_0$; and at the same time the cycling operation of relays B, D, E and A will commence in precisely the manner already discussed.

By way of specific example, let us assume that the first digit in the sequence to be checked comprises a number "4." Key $K_4$ will therefore be depressed; and inasmuch as the only closed relay contact coupled to the horizontal matrix line associated with key $K_4$ comprises the $0_4$ contact, a voltage will pass via contact $0_4$ through the vertical matrix line associated therewith and thence via normally closed relay contact $A_8$ to capacitor $C_8$. In short, the number "4," entered into the verifier, is automatically doubled by the matrix, in the "4" causes a charge to be accumulated in capacitor $C_8$. The closing of digit key $K_4$ also energizes line 60 and, accordingly, line 61 whereby cycle-initiate relay B pulls in. This in turn initiates precisely the cycle of operation already discussed in reference to FIGURE 5, in that energization of relay B is followed by energization of relay D which is in turn followed by energization of relay E and of relay A, with subsequent de-energization of relays B and D in sequence.

This sequential operation of the several relays B, D, E and A performs a clearing operation precisely the same as that already discussed during the time interval $t_4$ to $t_5$ whereby the previously energized digit relay 0 is dropped out by the momentary opening of relay contacts $B_4$ and $E_5$; and accordingly, when memory transfer relay A is energized at time $t_5$, the voltage which is now in capacitor $C_8$ is transferred to digit relay 8, which thereafter holds itself in by means of contact $8_{12}$.

As a result of the first digit entry, therefore, the number so entered is automatically doubled; and an appropriate digit relay, corresponding to this doubled number, is energized and holds itself in. Entry of the second number in the sequence will cause an addition and doubling to occur in precisely the manner already discussed. By way of example, let us assume that the second number in the sequence to be entered is a "2." It will be recalled that, as a result of the entry of "4" in the first step, digit relay 8 is now energized. Accordingly, when the second number "2" is entered, it can pass only via the closed contact of digit relay 8 which is coupled to the horizontal line associated with digit key $K_2$.

In particular, depression of key $K_2$ will cause a voltage to be coupled via now closed relay contact $8_2$ to capacitor $C_9$ whereafter this voltage will be transferred to digit relay 9 and will be held there preparatory to reception of the third input digit. It should be noted that the doubling procedure accomplished by entry of the first digit resulted in the number "8." The second input number being "2," would result in an addition of "8" plus "2" equals "10"; and double of the number "10" would produce "20." Casting out "11" from this result, produces "9" which, of course, corresponds to the digit relay actually energized as a result of entering the second digit "2."

It will be appreciated therefore that the entry of the second number produces an addition of that number to the doubled number of the preceding entry; doubles the resultant of this addition; casts out any "11" which might occur; and then automatically stores the newly doubled result in proper position in a digit relay preparatory to reception of the next input digit.

Precisely the same sequence will occur for entry of each of the successive digits in the input number sequence whereby after the number sequence is entered, and assuming that no check symbol is appended thereto, the final digit relay which is energized will correspond to the weighted sum of the input digits. This final digit relay can be employed to actuate an appropriate indicator showing the proper check digit, if the device of FIGURE 4 is to be employed as a check digit computer.

On the other hand, when employed as a check digit verifier, the last number in the input sequence will, in accordance with the preceding discussion, normally comprise the P's complement (or 11's complement) of the weighted sum of the input number series. Accordingly, when this check is entered as the last entry, it should cause only the zero digit relay to be energized and the other digit relays 1 through $x$ to be de-energized. Any other energization of the digit relays will, of course, comprise an error. In order to check for the occurrence of errors, a series of contacts $1_{13}$ through $0_{13}$, inclusive, associated with the several digit relays 1 through 0, inclusive, are interconnected to one another in the manner shown in the lowermost portion of FIGURE 4. Ten of these contacts $1_{13}$ through $x_{13}$ are normally open contacts, while the 11th contact $0_{13}$ is normally closed. If the 0 digit relay is, after entry of the complete sequence including the check digit, energized as it should be, the $0_{13}$ contact will be open as will all of the other contacts. Accordingly, application of an ending or test signal to line 65 will not be coupled via any of the contacts $1_{13}$ through $0_{13}$, inclusive, to the error indicator line 66. If, however, any digit relay other than the 0 digit relay is energized after entry of the complete sequence, the $0_{13}$ contact as well as one of the contacts $1_{13}$ through $x_{13}$, inclusive, will be closed, whereby the signal on line 65 will be passed to line 66 to indicate an error.

As discussed in reference to FIGURES 1 through 3, it is preferable to provide a keyboard lock thereby to assure that one digit cannot be entered until after the entry of a preceding digit has been completed or unless the complete entry, including the check digit, has been verified. The keyboard lock is, as before, associated with a keyboard lock relay designated, in FIGURE 4, as relay G. This relay G is, as shown, connected to line 66 so that if an error should occur this error, in addition to energizing the error indicator, will also energize keyboard lock relay G, thereby closing normally open contact $G_2$ thereof; and as a result, voltage will be passed from B+ through now closed contact $G_2$, to line 64 to actuate the keyboard lock. At the same time relay contact $G_1$ will close to pass holding power from B+ via normally closed relay contacts $E_5$ and $B_4$ to the keyboard lock relay G, thereby assuring that the keyboard is held in locked condition until cleared.

It will be appreciated, of course, that in addition to providing keyboard lock as a result of errors, the keyboard should be locked while a cycle computation is in progress. This is accomplished, in the arrangement shown in FIGURE 4, through the use of relay contacts $B_3$ and $E_4$. While a computation cycle is in progress, at least one of the relays B and/or E will be energized whereby at least one of the contacts $B_3$ and/or $E_4$ will be closed. Accordingly, power will be coupled from B+ via contact $B_3$ and/or $E_4$ to line 64 thereby assuring that the keyboard is locked during the cycle.

While we have thus described preferred embodiments of the present invention, many variations will be suggested to those skilled in the art, and certain of variations have already been discussed. Other variations will be readily apparent. Thus, by way of example, it has been assumed in the preceding description that the check digit makes up the least significant digit of the composite number. This is not a necessary prerequisite, however, since according to this invention the check digit may assume other positions in the number, providing the proper consideration be given to its value. It must therefore be emphasized that the foregoing discussion is meant to be illustrative only and should not be considered limitative of our invention; and all such variations and modifications as are in accord with the principles described are meant to fall within the scope of the appended claims.

The embodiments of the invention in which an exclusive property or privilege is claimed are defined as follows:

1. A check digit verifier adapted to operate on a series of indicia having number values, said indicia comprising a sequence of information indicia and a check symbol appended thereto which check symbol has a number value comprising the P's complement of a weighted sum, in radix P, of said information indicia, P being a prime number, comprising in combination an accumulator including means for accumulating manifestations representative of said number values and operable to accumulate manifestations in said radix P, said accumulator including a plurality of contact digit relays having the contacts thereof interconnected in a two-coordinate matrix, input means successively operable to enter manifestations of said successive indicia including said check input symbol into said accumulator, said input means including a keyboard coupled to one coordinate of said matrix in accordance with which of said relay contacts are closed, storage means coupled to the other coordinate of said matrix for temporarily storing said signals, program means operable intermediate each successive operation of said input means and including means responsive to entry of each said indicium manifestation into said accumulator for replacing the indicium manifestation in said accumulator by a different indicium manifestation comprising an integral multiple of the sum of said entered indicium manifestation and of the indicium manifestation previously stored in said accumulator, said program means including means for coupling said temporarily stored signals from said storage means to the coils of said relays thereby to control which of the contacts in said matrix are closed prior to each operation of said keyboard, and means operable subsequent to entry of the manifestation representative of the last indicium in said indicia series, and subsequent to the succeeding operation of said program means, for determining whether the final indicium manifestation in said accumulator is representative of a preselected integer.

2. The combination of claim 1 wherein said plurality of relays comprises P plural contact digit relays each of which has a coil and at least P contacts controlled thereby, said contacts being disposed in said two-coordinate matrix having matrix dimensions P x P, said storage means comprising P capacitors coupled to said matrix, said program means including control relay means for selectively completing circuits between said P capacitors and the coils of said P digit relays.

3. A check digit verifier comprising an accumulator to accumulate in modulo eleven, means for clearing said accumulator to zero, input means for thereafter successively entering manifestations, having number values respectively representative of a sequence of indicia including a check indicium, into said accumulator, whereby each operation of said input means effects an accumulation, in modulo 11. of the entered number value manifestation with the number value manifestation already in said accumulator, control means operable subsequent to completion of each such accumulation and prior to the next subsequent operation of said input means, for doubling the number value result of the accumulation and for replacing the manifestation in said accumulator by a manifestation representative of said doubled number value, and means for preventing said next subsequent operation of said input means until completion of the operation of said control means.

4. The combination of claim 3 wherein said accumulator comprises a relay matrix.

5. A device for receiving numerical information comprising storage means having a plurality of locations for storing signals each representing a number, input means including a plurality of input elements for generating signals each representing a number, means responsive to a stored signal at one of said locations to direct an input signal from one of said input elements to a particular one of said locations, the particular location being determined by said input signal and the signal stored in said storage means prior to the entry of said input signal, and means for preventing the operation of said input means until the completion of the operation of the last-named means.

6. The invention as set forth in claim 5 wherein the particular location to which said input signal is directed represents a number which is double the sum of the numbers represented by said one input element and the number stored in said storage means.

7. The invention as set forth in claim 6 wherein all signals at said locations except the last entered signal are unstored.

8. A device for determining or verifying a check digit comprising storage means having a plurality of locations representing manifestations, input means for successively entering manifestations, having number values respectively representative of a sequence of indicia including a check indicium, into said storage means, means including a plurality of normally open paths between said input means and said storage means, means for selectively closing one of said paths whereby each operation of said input means effects an accumulation in said storage means of the doubled value manifestation of the sum of an entered number value manifestation into said input means and the number value manifestation already in said storage means, and means for preventing the operation of said input means until the completion of the operation of the last-named means.

9. A device for receiving numerical information comprising storage means having a plurality of storage elements for storing signals each representing a number, input means including a plurality of input elements for generating signals each representing a number, means connected between said input means and said storage means responsive to an activated condition of said storage means to direct an input signal from a selected input element of said input means to a particular one of said storage elements, the particular storage element being determined by the value of an input signal to said selected element and the activated condition of said storage means, all the signals at said storage elements except the last-entered signal being unstored, and said particular storage element to which said input signal is directed representing a number which is double the sum of the numbers represented by said selected input element and that stored in one of said storage elements prior to the entry of the signal from said selected input element, and means for preventing the operation of said input means until the completion of the operation of the last-named means.

10. The invention as set forth in claim 9 wherein the means connected between said input and storage means comprise a plurality of switches.

11. The invention as set forth in claim 10 wherein said storage elements comprises a plurality of capacitors.

12. The invention as set forth in claim 11 wherein said input elements comprise keys on a keyboard.

References Cited

UNITED STATES PATENTS

| | | | |
|---|---|---|---|
| 2,684,201 | 7/1954 | Starreveld et al. | 235—153 X |
| 2,754,054 | 7/1956 | Helmig et al. | 340—146.1 |
| 2,765,982 | 10/1956 | Knutsen | 235—61.7 |
| 2,776,091 | 1/1957 | Chenus | 235—153 X |
| 2,886,240 | 5/1959 | Linsman | 235—153 |
| 3,183,482 | 5/1965 | Aberth et al. | 340—146.1 |

MALCOLM A. MORRISON, *Primary Examiner.*

C. E. ATKINSON, *Assistant Examiner.*

U.S. Cl. X.R.

235—61.7; 340—146.1